(12) United States Patent
Hulyalkar et al.

(10) Patent No.: US 9,204,086 B2
(45) Date of Patent: Dec. 1, 2015

(54) METHOD AND APPARATUS FOR TRANSMITTING AND USING PICTURE DESCRIPTIVE INFORMATION IN A FRAME RATE CONVERSION PROCESSOR

(75) Inventors: Samir N. Hulyalkar, Newtown, PA (US); Larry A. Pearlstein, Newtown, PA (US)

(73) Assignee: BROADCOM CORPORATION, Irvine, CA (US)

( * ) Notice: Subject to any disclaimer, the term of this patent is extended or adjusted under 35 U.S.C. 154(b) by 1946 days.

(21) Appl. No.: 12/174,738

(22) Filed: Jul. 17, 2008

(65) Prior Publication Data

US 2010/0013988 A1    Jan. 21, 2010

(51) Int. Cl.
*H04N 7/173* (2011.01)
*H04N 7/01* (2006.01)
*H04N 21/431* (2011.01)
*H04N 21/434* (2011.01)
*H04N 21/4402* (2011.01)
*H04N 5/445* (2011.01)
*H04N 5/45* (2011.01)

(52) U.S. Cl.
CPC .............. *H04N 7/013* (2013.01); *H04N 7/0135* (2013.01); *H04N 21/4316* (2013.01); *H04N 21/4348* (2013.01); *H04N 21/440281* (2013.01); *H04N 5/45* (2013.01); *H04N 7/0112* (2013.01); *H04N 7/0132* (2013.01)

(58) Field of Classification Search
USPC ............ 725/45, 135, 136; 348/446, 448, 459; 375/240.21
See application file for complete search history.

(56) References Cited

U.S. PATENT DOCUMENTS

| | | | | |
|---|---|---|---|---|
| 5,623,308 | A * | 4/1997 | Civanlar et al. | 375/240.01 |
| 5,953,506 | A * | 9/1999 | Kalra et al. | 709/231 |
| 6,456,335 | B1 * | 9/2002 | Miura et al. | 348/588 |
| 6,490,250 | B1 * | 12/2002 | Hinchley et al. | 370/232 |
| 6,564,003 | B2 * | 5/2003 | Marko et al. | 386/241 |
| 7,206,026 | B2 * | 4/2007 | Hsiung et al. | 348/441 |
| 7,405,768 | B2 * | 7/2008 | Tanaka | 348/452 |
| 7,688,384 | B2 * | 3/2010 | Davis et al. | 348/441 |
| 8,116,588 | B2 * | 2/2012 | Choe et al. | 382/284 |
| 8,937,683 | B2 * | 1/2015 | Deng et al. | 348/452 |
| 2001/0010708 | A1 * | 8/2001 | Nakazawa | 375/240.25 |
| 2002/0147987 | A1 * | 10/2002 | Reynolds et al. | 725/110 |
| 2003/0035481 | A1 * | 2/2003 | Hahm | 375/240.16 |
| 2004/0252230 | A1 * | 12/2004 | Winder | 348/402.1 |

(Continued)

*Primary Examiner* — Pankaj Kumar
*Assistant Examiner* — Reuben M Brown
(74) *Attorney, Agent, or Firm* — Foley & Lardner LLP; Christopher J. McKenna; Daniel E. Rose

(57) ABSTRACT

A method and apparatus of frame rate conversion where descriptive information relating to an input video signal is transmitted to the frame rate converter along with the input signal. The descriptive information is used to interpolate frames, allowing the interpolator to make pixel analysis using the descriptive information relating to the original signal. The descriptive information is derived by a compositor/scaler and is transmitted to the frame rate converter with the composited/scaled signal. There may be multiple input signals that are composited to make a final composited video output such as a picture-in-picture display. The information may be transmitted in-band with the video signal received by the frame rate converter. Alternatively, the descriptive information may be transmitted in a separate stream in a side-band manner. In another embodiment, the descriptive information may be transmitted to the frame rate converter separate from the video input source as commands or packets.

12 Claims, 4 Drawing Sheets

(56) References Cited

U.S. PATENT DOCUMENTS

| | | | |
|---|---|---|---|
| 2004/0261135 A1* | 12/2004 | Cahnbley et al. | 725/146 |
| 2005/0001930 A1* | 1/2005 | Mao | 348/459 |
| 2005/0078884 A1* | 4/2005 | Yi | 382/300 |
| 2005/0134735 A1* | 6/2005 | Swartz | 348/554 |
| 2005/0249282 A1* | 11/2005 | Landsiedel et al. | 375/240.12 |
| 2006/0245502 A1* | 11/2006 | Cheng et al. | 375/240.24 |
| 2006/0271979 A1* | 11/2006 | Hejna, Jr. | 725/89 |
| 2007/0189392 A1* | 8/2007 | Tourapis et al. | 375/240.21 |
| 2007/0229703 A1* | 10/2007 | Lu | 348/441 |
| 2007/0258702 A1* | 11/2007 | Sugio et al. | 386/109 |
| 2008/0018785 A1* | 1/2008 | Bennett | 348/439.1 |
| 2008/0024390 A1* | 1/2008 | Baker et al. | 345/1.3 |
| 2008/0025390 A1* | 1/2008 | Shi et al. | 375/240.02 |
| 2008/0199156 A1* | 8/2008 | Uchiike et al. | 386/124 |
| 2008/0211968 A1* | 9/2008 | Murakami et al. | 348/699 |
| 2009/0208123 A1* | 8/2009 | Doswald | 382/236 |
| 2010/0013988 A1* | 1/2010 | Hulyalkar et al. | 348/441 |

\* cited by examiner

METHOD AND APPARATUS FOR TRANSMITTING AND USING PICTURE DESCRIPTIVE INFORMATION IN A FRAME RATE CONVERSION PROCESSOR

FIELD OF INVENTION

The present invention is related to frame rate conversion.

BACKGROUND

Moving pictures are captured using equipment that records a sequence of static images that, when displayed in sequence, create the appearance of motion. The rate at which the static images are captured is known as the frame rate. There are many standards defining the frame rates commonly used in film-making and television. In the United States, film is commonly captured at a rate of 24 frames per second (fps) or Hertz (Hz). At this rate, motion is captured adequately, and allows for creative expression due to a slow rate of image change. However, if viewed at this rate in a system designed to be viewed at a higher frame rate, the moving image may appear choppy. Video capture, as opposed to film, generally records images at a rate of 50 to 60 fps.

Video processing and display devices may receive input signals representing motion pictures captured at different frame rates. Additionally, processing may have occurred to the signal prior to it reaching the device whereby the received signal is converted to a different frame rate than the frame rate at which the original source was captured. In either case, the input signals must be processed and the signal to be displayed must be converted to a frame rate appropriate for the display device. When the frame rate needs to be increased, the frequency of the sequenced images may be increased by repeating frames a certain number of times. While this does not accurately reproduce the true motion of the subject of the image, it may allow the viewer to perceive the video with less flickering, on some types of display devices. Additionally, frame rate conversion processing may include analysis of changes from one frame to the next at a pixel level to create estimates of the motion within the image and thereby allow intermediate frames to be synthesized, to enhance the perception of motion.

It is becoming increasingly popular to convert video images from 50 or 60 Hz to 100 or 120 Hz to get much higher frame rates. This can reduce the motion blur problem inherent in those LCD displays which use a fluorescent backlight. When images are displayed on such LCD displays at a higher frame rate, there is a psycho-visual phenomenon occurring within the brain of the viewer where the appearance of blurring is lessened. Achieving motion blur reduction in this way requires motion compensated frame rate conversion.

Occasionally, an input signal will include image capture information from more than one original source. An example of this is picture-in-picture where a video image is displayed as background with a second video image being inset into the first video image so that both motion pictures can be viewed simultaneously. In order to do this, the multiple input signals must be combined into a composited signal containing both sequences of images. This composited image must be converted to a single frame rate regardless of the frame rates at which each of the original images was captured. In present frame rate conversion systems, such conversions may exhibit undesired visual artifacts when attempting to display the composited image after frame rate conversion. These systems lose information about each of the input signals when the signals are combined in the compositing and scaling process. Such information could be used by the frame rate converter when creating frame rate conversion decisions. Therefore it would be beneficial to have a system where the data regarding input video signals is generated and transmitted to the frame rate converter processor along with the signal for use by the frame rate converter to create a final output video image.

SUMMARY

A method and apparatus for performing frame rate conversion in video signals includes receiving one or more independent input video signals, each originally captured at a particular frame rate. The frame rate is changed by a frame rate converter to a new desired frame rate for the device or system on which the final video signal is to be viewed. Multiple independent input video signals may be combined in a final video image that contains distinct images from each input source signal in a composited video signal that allows each independent input video signal to be viewed simultaneously. Descriptive information relating to each independent input video signal is available at the time the signal is received. The descriptive information is identified and maintained during the compositing process then transmitted to a frame rate converter that makes decisions regarding frame rate conversion based, in part, on the descriptive information to create a final video output signal at a desired frame rate. The availability of the descriptive information enables the frame rate conversion to be performed with reduced computational complexity and/or improved picture quality.

DETAILED DESCRIPTION OF THE PREFERRED EMBODIMENTS

Frame rate conversion is an important process in providing high quality motion pictures for viewing on various display equipment. Video signals are made up of sequences of separately captured pictures that, when viewed in their proper sequence, create the appearance of motion in subject matter of the picture. When it is desired to increase the frame rate of a given video signal, however, a problem exists in that the true movement of the subject matter was captured at a lower frame rate, and images of the intervening timeframe between frames are not captured, so processes must be devised to create a higher frame rate sequence by estimating the missing timeframes by evaluating the changes in pixels from one captured frame to the next. Individual frames may sometimes be repeated in the final video signal to provide a higher frame rate than the originally captured frame rate.

Some video applications involve the displaying of multiple input signals in a single viewing area. Examples of this are an on-screen display such as a menu, or a picture-in-picture display where one video image serves as a background while a second video image appears as an inset within the first image in a single video image containing independent video sub-parts. In cases like this, multiple video input signals are combined into a composited video signal representing the images of all input signals. Also, a particular input video signal may be resized to accommodate the dimensions of the composited signal. The terms compositor and scaler are used to identify the device or process of combining and resizing input signals, respectively.

Figure 1:
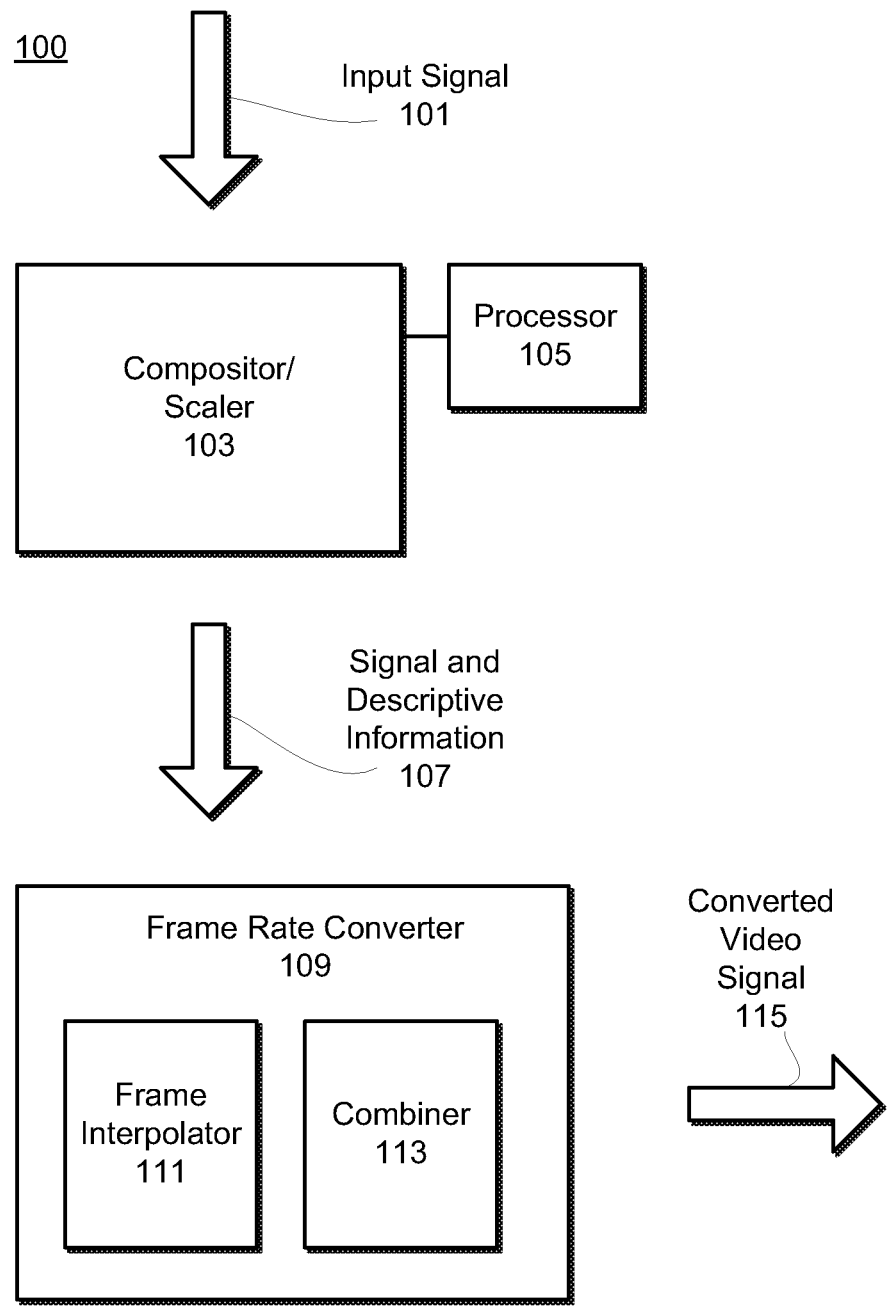
FIG. 1 is a block diagram of a frame rate conversion system in accordance with an embodiment of the present invention.

In FIG. 1, an overview of frame rate conversion in accordance with the present invention is shown. The frame rate conversion 100 begins with an input signal 101. The input signal 101 may come from a digital video recorder, a set-top box, or a video game console, among other input devices. As the signal is received by, for example, a television receiver, information pertaining to the origin and nature of the signal is present. A processor 105 that controls the compositor/scaler 103, derives and maintains the descriptive information associated with the input signal. Descriptive information may be derived from system states associated with a unit. For example, the port on which an input signal 101 is received may be limited as to the resolution it can process. In such a case, the resolution may be increased within the compositor/scaler 103. This information is passed to the frame rate converter 109 to allow the frame rate converter 109 to know that the original signal 101 was a lower resolution signal and use this information advantageously in performing the interpolation and frame rate conversion. Once the compositor/scaler's 103 controller processor 105 has derived the descriptive information, and the compositing and scaling process is complete, the video signal and the descriptive information are sent 107 to the frame rate converter 109. The frame rate converter has a frame interpolator 111 that creates new frames that will be combined with the original frames in the input signal 101 by a combiner 113 to become the converted video signal 115. The converted video signal 115 is the output of the frame rate converter 109 and is a version of the input signal 101 at a higher frame rate.

The descriptive information that is derived by the controller processor 105 of the compositor/scaler 103 is helpful when interpolating frames. Interpolation requires analysis of various areas of pixels in each transmitted image to analyze apparent motion indicated in changing pixels from one frame to the next. The task becomes more complicated as captured video may have several subjects in the frame each moving at a different relative speed. An example of this is a video image of a person in the foreground walking on a sidewalk along a street while cars are speeding by in the background. The frame interpolator 111 must identify the relative motion of each element of the video image and compensate for the relative motion of each subject. By comparing the differences between video frames that are temporally near each other, estimations can be made to interpolate frames between the existing frames that attempt to reproduce the scene at a time that was not captured in real time as the source signal 101 was captured. Descriptive information, such as the original capture frame rate and the original resolution of the original input signal 101 among other descriptive factors make the job of the frame interpolator 111 easier and more efficient. This descriptive information would be lost before the signal reached the frame rate converter 109 had the signal not been transmitted along with the descriptive information 107.

Figure 2:
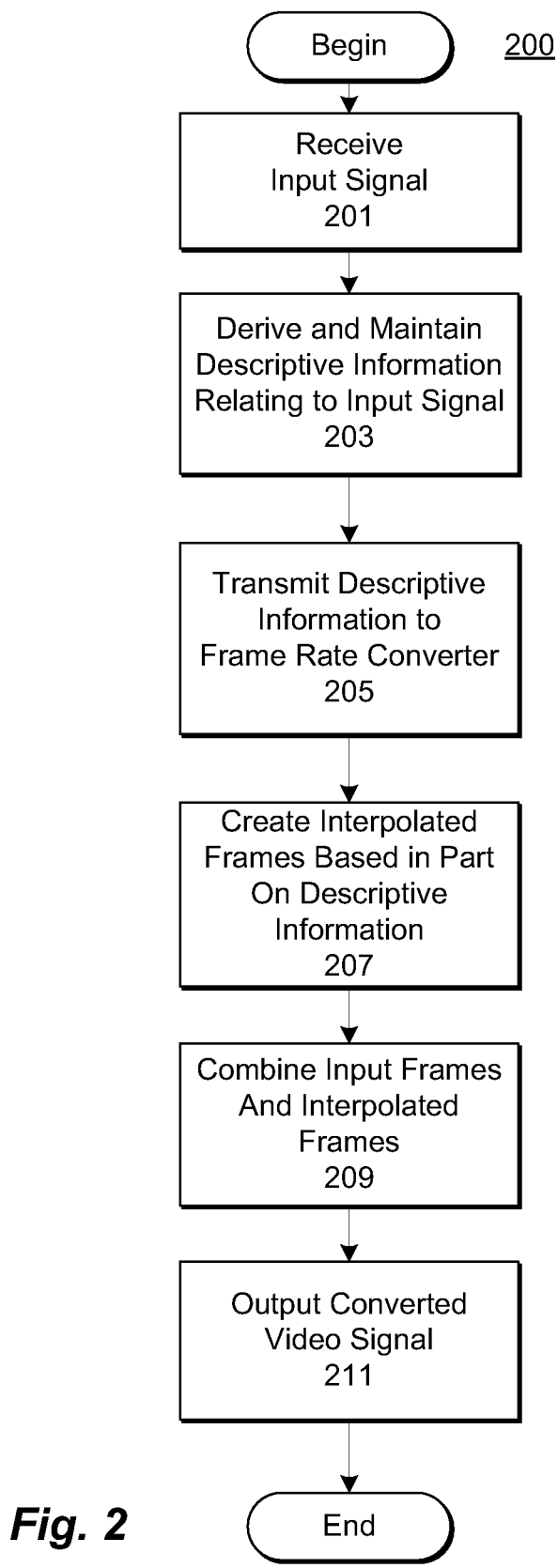
FIG. 2 is a flow diagram depicting a method of frame rate conversion in accordance with an embodiment of the present invention.

A method of transmitting and using descriptive information in a frame rate conversion processor 200 is shown in FIG. 2. An input signal is received by a compositor/scaler processor (block 201). There may be multiple signals received and each may have been captured at different frame rates originally. One of the signals may also relate to an on-screen display such as a menu that will be overlaid on a video image used as a background. When the input signal is received, information descriptive of the input signal is available to the compositor/scaler unit. For example, based on the port receiving the signal, information regarding the resolution of the incoming signal is available. In the case where a user of a digital video recorder, set-top box, video game console or similar device requests a menu from a user interface, the dimensions and information pertaining to the requested menu is known before the menu is overlaid on another input video signal. A processor that controls the compositor/scaler unit derives the information from the source and nature of the input signal and maintains this descriptive information as indicated in step 203. The compositor/scaler then transmits the descriptive information to the frame rate converter (step 205). The frame interpolator then creates interpolated frames based in part on the descriptive information transmitted from the compositor/scaler as indicated in step 207. Interpolation creates new frames in order to increase the frequency of the input signal. The interpolated frames are frames that did not exist in the original input signal, but are created based on frames that are temporally nearby to the frame being interpolated. Once the additional frames have been created based in part on the descriptive information, the interpolated frames are combined with the input signal as shown in 209. Once the input signal and the interpolated frames are combined, the result is a converted output video signal with a different frame rate than the input signal as depicted in 211.

Figure 3:
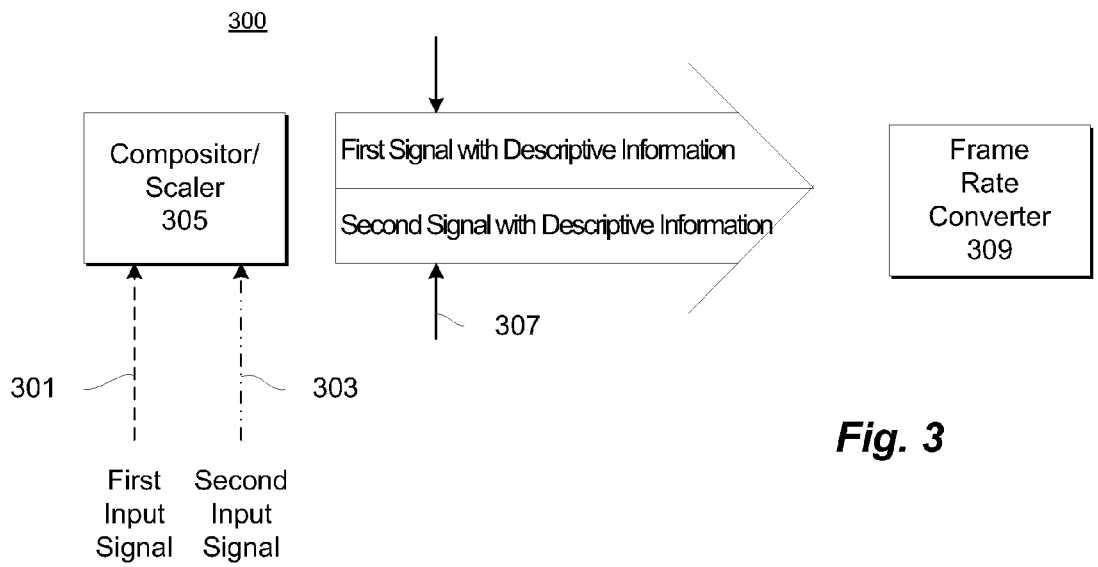
FIG. 3 is a block diagram of a system of frame rate conversion in accordance with an embodiment of the present invention.

Referring to FIG. 3, a frame rate conversion system 300 capable of processing multiple input signals to create a composited video signal 307 and subsequently perform frame rate conversion according to an embodiment of the present invention is depicted. A first input video signal 301 and a second input video signal 303 are originally captured at potentially different frame rates. While two input video signals 301, 303 are shown for simplicity, more than two input video signals could be processed by the system 300 without departing from the scope of the invention. The input video signals 301, 303 are received by a compositor/scaler 305. When the input video signals 301, 303 are received, there is descriptive information that can be derived related to each input video signal 301, 303. For example, based on a port through which the input video signal 301, 303 was received, the resolution of the original video signal 101, 303 may be determined. A user interface though which a user requests a picture-in-picture display, or similar composited signal sends signals or commands to a controlling processor associated with the compositor/scaler 305. The controller is not shown for simplicity. Descriptive information related to the input signals would be derived and maintained by the controlling processor which in turn controls the action of the compositor/scaler 305. The controller could either be programmable or hard wired as a specifically designed circuit. The compositor/scaler will use the descriptive information to process the individual input video signals 301, 303 and combine them to create a composited video signal 307. During the compositing process in the compositor/scaler 305, the descriptive information is maintained and then passed with the composited video signal 307 to the frame rate converter 309. The frame rate converter 309 receives the composited video signal 307 and uses the descriptive information passed from the compositor/scaler 305 with the composited video signal 307 and creates a video output for viewing with a different frame rate than the frame rate of the composited video signal 307 for optimal viewing on the intended display device.

While the compositor/scaler 305 and the frame rate converter 309 are described herein in view of their separate functions, the system 300 of FIG. 3 could be implemented as individual components, or integrated as a single unit. As such, the system 300 could be implemented in an application specific integrated circuit chip (ASIC), or the compositor/scaler 305 could be implemented in one ASIC while the frame rate converter 309 may be implemented in another ASIC. Additionally, the system 300 of FIG. 3 may be implemented in a single electronic component, for example, a digital video recorder (DVR) or television receiver. Conversely, the compositor/scaler may be implemented in one electronic component while the frame rate converter 309 may be implemented in a separate electronic component.

Figure 4:
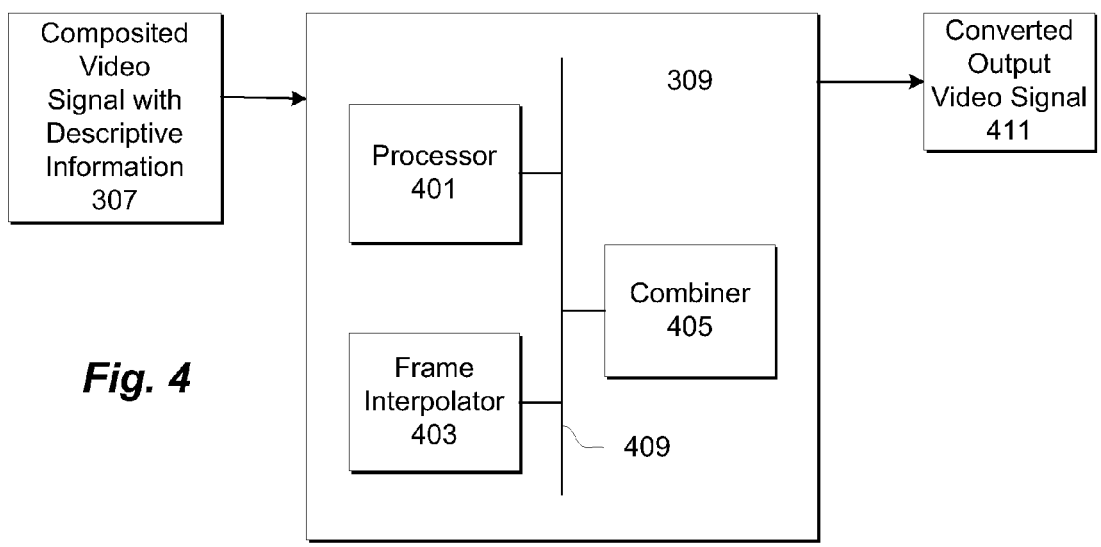
FIG. 4 is block diagram of a frame rate converter in accordance with an embodiment of the present invention.

FIG. 4 depicts the frame rate converter 309 of an embodiment of the current invention. The basic operation of the frame rate converter 309 is to receive a composited video signal with descriptive information 307 and produce interpolated frames that will be combined with input frames to produce an output video signal 411 that has a different frame rate than the composited video signal 307 received by the frame rate converter 309. In order to do this, the frame rate converter 309 may have to add frames to the initial composited video signal 307. To add frames, the frame rate converter 309 may duplicate frames in the composited video signal 307, or may draw frames by analyzing each pixel in each frame, comparing them to pixels in temporally nearby frames in the picture sequence. The analysis of each pixel is a complicated process and problems arise particularly, when in the case of a composited video signal 307, there are video representations of two independent original video signals 301, 303. Relative motion between the pixel elements of the first input video signal 301 and the pixel elements of the second input video signal 303 should not be considered by the frame rate converter 313 to compensate for motion when inserting new frames to create the output video signal 411. Picture resolution can also cause increased processing load on the frame rate converter's 309 processor 401 by forcing the processor 401 to consider a higher number of pixel elements for a higher resolution signal. If the original captured video signal 301, 303 was captured in a lower resolution and was upsampled by the compositor/scaler 305, the additional pixel elements analyzed by the compositor/scaler 305 create more processing requirements for the processor 401 in the frame rate converter 309. The frame rate converter 309 uses the descriptive information, in this case the original source resolution, that was received with the composited video signal 307, to make a decision to downsample the composited video signal 307 before performing frame rate conversion, thereby reducing processing requirements. After the frame rate conversion, the frame rate converter 309 can upsample the video signal again to create a higher resolution output video signal 411. The frame rate converter 309 can take further advantage of source resolution descriptive information e.g. to adjust thresholds for triggering global fallback or for other picture processing optimizations. Similarly, if the descriptive information included an indication that the incoming video signal 307 contained a composited image and the pixel locations relating to each independent input video source, the frame rate converter 309 could more intelligently perform frame rate conversion by not considering unrelated pixel elements when doing motion estimation on a particular video input signal.

When two or more video streams are composited into a single stream, the input streams may have drastically different frame rates, or may have only slight differences. For instance, the nominal frame rate for US video signals is 59.94 Hz, however, there is a tolerance so if two input signals have frame rates of 59.94001 Hz and 59.94003, over time the frames in the two signals would fall out of synchronization causing excess or dropped frames in one of the signals. In another example, if the input streams were captured at approximately 24 Hz, a 3:2 pulldown would typically be used to convert the 24 Hz signal to 60 Hz. This adaptation of 24 Hz to 60 Hz will create phase differences causing frames to fall out of synchronization.

The frame rate converter 309 in FIG. 4 is comprised of a processor 401 that interprets an input composited video signal, along with descriptive data relating to the source of the video picture information contained in the composited video signal 307. The frame rate converter 309 further comprises a frame interpolator 403 connected to the processor 401 and a combiner 403 through a suitable communications bus 409. Frame interpolator 403 uses the descriptive information received with the composited video signal 307 to analyze the pixels in each frame received in the composited video signal 307. The frame interpolator 403 creates new frames and a combiner 405 inserts them between the existing frames that were part of the original signal 307. Optionally, the processor may be composed of either or both of fixed function and stored-program processing units, to perform frame rate conversion. The descriptive information received with the composited video signal 307 is used by the frame interpolator 403 to make decisions relating to the creation of new frames.

While the example presented above includes a composited video signal comprising two original input signals, a single received signal could be transmitted to the frame rate converter 309 with descriptive information and be used to convert the frame rate of the single input stream.

Figure 5A:
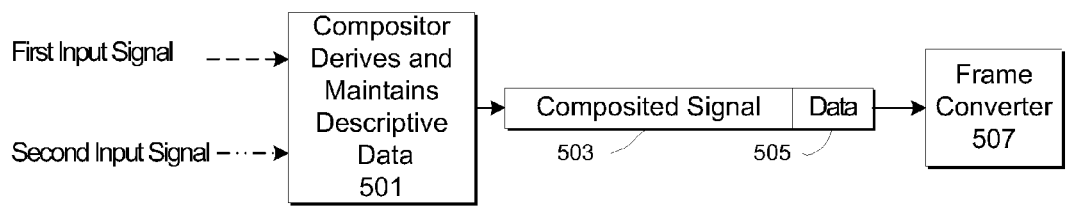
FIG. 5A is a block diagram of a compositor/scaler using in-band transmission in accordance with an embodiment of the present invention.
Figure 5B:
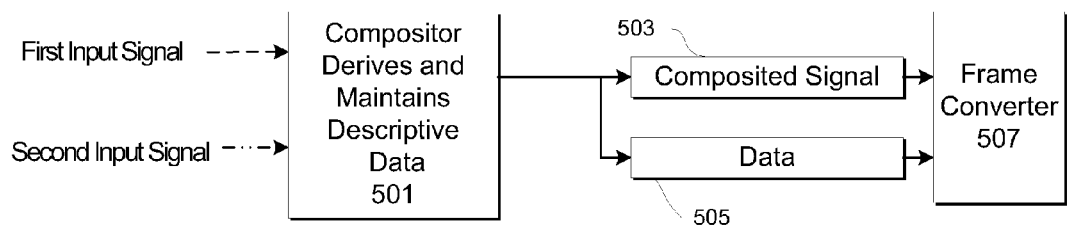
FIG. 5B is a block diagram of a compositor/scaler using side-band transmission in accordance with an embodiment of the present invention

FIGS. 6a and 5b are block diagrams representing the compositor/scaler 105 in accordance with example embodiments of the invention. FIG. 6a shows an embodiment where a composited video signal 503 and its associated descriptive information 505 are transmitted in-band as a single output data stream. FIG. 5b shows an alternative embodiment where the composited video signal 503 and its associated descriptive information 505 are transmitted in a side-band configuration as two separate data streams. The composited signal could also be transmitted without the descriptive information. In such a case the descriptive data relating to the composited video signal 503 could be transmitted as commands or command packets that may be sent by a slower speed interface such as Inter-Integrated Circuit (12C).

Although the features and elements are described in particular combinations, each feature or element can be used alone without the other features and elements or in various combinations with or without other features and elements. The methods or flow charts provided may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

What is claimed is:

1. A method of frame interpolation in a frame rate converter, the method comprising:
receiving a composited video signal comprising a first video signal and a second video signal;
receiving descriptive information associated with the first video signal, the descriptive information indicating a source resolution associated with the first video signal; and
using the descriptive information to create a new video frame of the composited video signal based on a frame that is temporally near the new frame being created, wherein using the descriptive information comprises adjusting a threshold for triggering a global fallback.

2. A frame rate converter comprising:
a frame interpolator configured to use descriptive information related to a composited video signal to create a plurality of new frames based on the composited video signal by adjusting a threshold for triggering a global fallback, the descriptive information indicating a source resolution associated with a first video signal of a plurality of video signals that have been composited during a compositing process of the composited video signal; and
a combiner for inserting the plurality of new frames in the composited video signal to create an output video signal.

3. The frame rate converter of claim 2, further comprising a receiver configured to receive a single data stream containing both the composited video signal and the descriptive information.

4. The frame rate converter of claim 2, further comprising a receiver configured to receive the composited video signal in a first data stream and the descriptive information in a second data stream.

5. The frame rate converter of claim 2, wherein the frame interpolator is configured to disable frame rate conversion based on the descriptive information.

6. A frame interpolator comprising:
a first circuitry configured to receive a composited video signal comprising a first video signal and a second video signal; and
a second circuitry configured to receive descriptive information relating to the first video signal, wherein a plurality of new frames are created based on data contained in the in the composited video signal and based in part on the descriptive information by adjusting a threshold for triggering a global fallback, wherein the descriptive information comprises information representing a plurality of pixel locations with respect to a corresponding frame of the composited video signal.

7. A video processing system comprising:
a compositor/scaler capable of receiving a plurality of video input streams and maintaining descriptive information about said plurality of video input streams, wherein said compositor/scaler outputs a single video output stream having an output frame rate and transmits said descriptive information, said descriptive information comprising an original frame rate associated with a first video input stream of the plurality of video input streams, the original frame rate being different from the output frame rate; and
a frame rate converter that receives said single video output stream and said descriptive information, wherein said descriptive information is used by said frame rate conversion processor to make a frame rate conversion decision by adjusting a threshold for triggering a global fallback.

8. A non-transitory machine readable storage medium having a stored set of instructions executable by a machine, the instructions comprising:
instructions to create a composited video stream from a plurality of input video streams, the plurality of input video streams comprising a first video stream and a second video stream;
instructions to maintain descriptive information, wherein the descriptive information indicates at least one of an original frame rate of the first video stream or a source resolution of the first video stream, wherein the descriptive information further indicates at least one of an original frame rate of the second video stream or a source resolution of the second video stream; and
instructions to create a final video output stream having a different frame rate than the composited video stream using the descriptive information by adjusting a threshold for triggering a global fallback, the descriptive information indicating whether to downsample the composited video stream.

9. The non-transitory machine readable storage medium of claim 8 further comprising instructions to transmit the descriptive information and the composited video stream in a single output stream.

10. The non-transitory machine readable storage medium of claim 8 further comprising instructions to transmit the descriptive information in a first data stream and the composited video stream in a second data stream.

11. The non-transitory machine readable storage medium of claim 8 further comprising instructions to use the descriptive information to disable frame rate conversion for the video stream relating to the descriptive information.

12. A non-transitory computer-readable medium containing a set of instructions executable by a processor, wherein upon execution of the instructions, the processor is configured to:
create a composited video stream from a plurality of input video streams to facilitate the plurality of input video streams to be viewed simultaneously:
maintain descriptive information for each input video stream in the plurality of input video streams, the descriptive information comprising at least one of an original capture frame rate associated with one of the input video streams or an original resolution associated with one of the input video streams; and
create a final video output stream using the descriptive information and having a different frame rate than the composited video stream by adjusting a threshold for triggering a global fallback.

* * * * *